Oct. 10, 1967     T. N. BLAU ETAL     3,346,016
HIGH TEMPERATURE THERMAL INSULATION
Filed Jan. 2, 1964
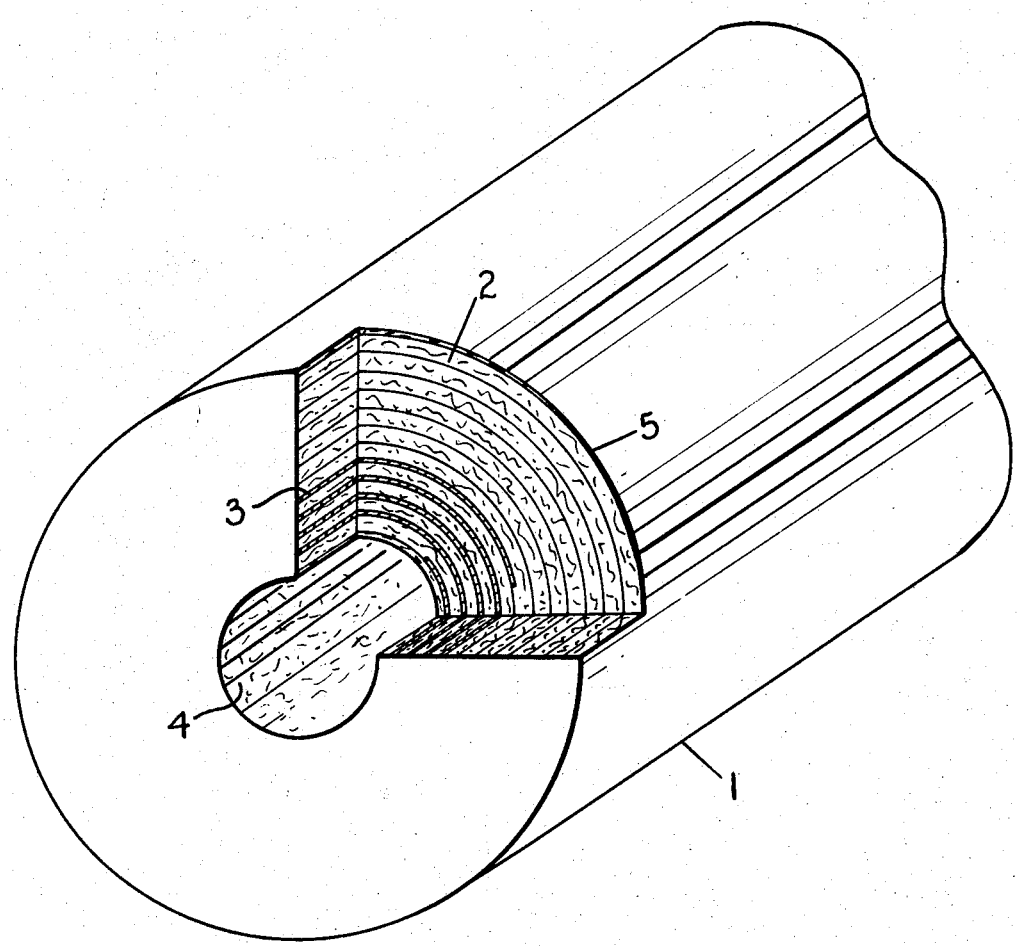
INVENTORS
THEODORE N. BLAU
BY    EDWARD J. DAVIS
John A. McKinney
ATTORNEY

United States Patent Office

3,346,016
Patented Oct. 10, 1967

3,346,016
HIGH TEMPERATURE THERMAL INSULATION
Theodore N. Blau and Edward J. Davis, Middlesex, N.J., assignors to Johns-Manville Corporation, New York, N.Y., a corporation of New York
Filed Jan. 2, 1964, Ser. No. 335,420
12 Claims. (Cl. 138—138)

This invention relates to thermal insulations, and more particularly to low density insulations for high temperature applications.

Of the numerous known or available materials exhibiting thermal insulating characteristics relatively few are suitable for very high temperature applications, and of those adaptable for high temperature conditions even less are of a composition which can be provided in a form or construction of very low densities, for example less than about 10 pcf., and maintain their high insulating properties, in particular low unit heat flow per unit weight. For instance, the numerous common very low density and relatively effective insulating materials of organic composition as, for example, cellulose and the like fibers, cork etc., and those of inorganic compositions of relatively low melting points comprising many mineral and glass fibers and/or which incorporate organic constituents such as starch or resin binders, organic pigments, etc., are subject to thermal deterioration and/or destruction upon exposure to temperature conditions of, for example, in excess of about 400 to 700° F., and typical high temperature resistant, or all inorganic insulations such as the self-bonding hydrated calcium silicates, clay-like refractories, diatomaceous earth, etc., cannot normally be practically or effectively formed or constructed as products of very low apparent densities. For example, the common all inorganic self-bonding calcium silicate insulations are produced in minimum densities of at least about 10 to 12 lbs./cu. ft. or greater, and diatomaceous earth based insulations range upwards from about 20 lbs./cu. ft. apparent density, with many other all inorganic materials being of considerably greater weight.

It is the primary object of this invention to provide very lightweight insulations of high insulating efficiency which are durable and effective over an extensive range of thermal conditions up to and including relatively high temperatures.

It is also an object of this invention to provide effective high temperature thermal insulations of low densities which are self-supporting or coherent and integrated and have very low thermal conductivities or heat conductance in relation to the weight of the insulating product.

It is a further object of this invention to provide low density insulations which may comprise organic binders and/or other organic constituents and yet possess a maximum temperature limit of approximately twice that of similar low density, organic bonded insulations as well as decidedly enhanced thermal insulating properties.

It is a further object of this invention to provide high temperature, low density fibrous insulations embodying conventional organic binders such as common thermosetting resins which are effective and useful at temperatures up to and even in excess of about 1000° F.

It is a further object of this invention to provide novel means of deterring or inhibiting burn out of the binder or other combustible ingredients and in turn autogenous thermal consumption or decomposition, and the propagation and acceleration of such conditions through the gases evolved therefrom, in high temperature thermal insulations comprising combustible components or materials adversely affected by relatively high temperatures.

It is a still further object of this invention to provide specific, unique constructions for lightweight fibrous insulations in high temperature applications which permit the utilization or installation of metallic foils or sheets in direct contact with the other constituents comprising the individual fibers or fibrous bodies thereof, and the inclusion of binders in normal amounts without entailing a degradation of the thermal insulation properties or the low thermal conductivity of such products at high temperatures as well as at relatively low temperature conditions.

These and other objects and advantages of this invention will become more apparent from the hereinafter detailed description.

The drawing comprises a fragmentary pictorial view of a typical cylindrical pipe insulation section constructed pursuant to the concept of this invention and comprising a cross sectional view thereof illustrating in detail the essential components and their relative arrangement.

This invention, in general, embodies a novel and specific combination and construction of particular materials or classes thereof which are so arranged or applied in a specific manner whereby they cooperate or coact to provide a very low density thermal insulation of low weight per unit heat flow which, notwithstanding the presence of organic components and the extensive incorporation and contacts with bodies of metal, maintains its integrity and other desired properties through temperatures of at least about 1000° F. and possesses improved thermal conductivity properties. More specifically, this invention comprises combining and constructing or arranging low density insulating materials of common compositions such as fibrous masses with metal or the like incombustible inorganic sheets such as foil in a specific pattern wherein each of said components complements the other to synergistically retard and negate thermal deterioration or decomposition of the insulating bodies or components thereof and more effectively control or minimize the passage or transfer of thermal energy therethrough.

The high thermal efficiency of many current insulating materials or products and the degree of insulating efficiency and dimensions required in many applications frequently are of such high levels that when the temperatures within the body of the insulation material or product, due to its contact or association with the temperatures of the mass or area insulated, reach the ignition or thermal decomposition point of any organic component such as binders, etc. or of any inorganic ingredient unstable at relatively low temperatures, the heat produced by the ensuing combustion or from any exothermic decomposition reaction is not readily dissipated or released from the interior areas of the insulation through the adjacent or surrounding material. Thus, the temperatures within an insulating material or product of typical dimensions or thickness, e.g., at least about two inches, frequently build up and reach levels well in excess of the maximum temperature of the contacting or associated mass or area insulated and are such as to effect ignition or thermal decomposition of organic or thermally unstable inorganic components whereby the interior portions of the insulation material or product, once thermally incited by the external temperature conditions, are autogenously burned out or consumed and destroyed, aided by the accelerated effects of the hot expanding gases produced by combustion or decomposition, with the ultimate degradation or ruin of the insulation material or product.

It has been discovered that such autogenous thermal degradation or destruction in lightweight insulations composed of or containing combustible or thermally unstable material or ingredients can be effectively controlled and/or deterred to the point of preventing any discernible degradation to the over-all product and its utility or effectiveness, among other advantages including enhanced integrity or strength and insulating efficiency, through the means of multiple incombustible or heat resistant inorganic barriers such as metal sheets or foil, ceramic papers, etc. which are impervious to combustion or the products of combustion, applied at least within a specific critical area of the low density insulating material product and therein arranged or fabricated in an essential pattern or configuration. Specifically, the thermal barriers must be located within the insulating material or product substantially conterminously or coextensively with the effective insulating surface or dimensions of the insulating body such as blanket or sheathing and interleaved between and separated from one another by layers of the basic or principal insulating material such as felts or blankets of fibrous material. Moreover, it is essential that the said thermal barriers be interleaved between or within the basic or principal insulating material or product thereof adjacent to the hot side or surface in closest proximity to the high temperature mass or area insulated thereby, and providing therein in at least 2 up to about 15 barriers per inch of thickness of the composite or over-all insulation or product and thus extending or continuing such an arrangement or number of barriers from the said hot side toward the cold side of the insulation at least to a point or location intermediate the insulation or body thereof wherein the internal temperatures of the insulation or product, due to whatever causes, will not exceed about 400 to 600° F., and typically about 500° F., an approximate temperature above which organic components in general cannot endure.

The point or location intermediate to the hot or cold sides of the surfaces of a typical thermal insulation product, as for example the common low density fibrous insulations of at least about two inches thickness, wherein temperatures would not be likely to exceed 400 to 600° F., or more aptly about 500° F. under normal or routine conditions, of course, depends upon many considerations including the maximum temperatures of exposure from the mass or area insulated, the composition, density and thickness of the insulating material or product, etc. However, in high temperature insulation applications wherein the temperature substantially exceeds 500° F. and organic components would normally be destroyed or thermally unstable ingredients effected with ensuing deleterious effects upon the over-all product, and the thickness of the insulating product has been designed or correlated within reasonable limits for the maximum service temperature, the point or location within the insulation intermediate the hot and cold sides wherein the temperature would not normally be likely to reach in excess of 500° F. would be at least one-quarter of the distance from the hot side and more typically about one-third to two-thirds the distance from the hot side. Obviously, the exact position or precise internal temperature of the insulation can only be determined when all variables are known or through actual measurements obtained from a particular installation. Nevertheless, this condition can readily be ascertained as is apparent to those skilled in the insulating art.

It should be understood, however, that the thermal barriers can be continued beyond the foregoing critical area of the insulating material or product either in the given essential arrangement or in diminishing or modified numbers or arrangement, it being only necessary that the foregoing conditions or pattern be applied to achieve the stated objects and advantages, in particular the prevention of autogenous destructions, whereby additional measures are optional and may or may not be expedient depending upon costs, enhanced or retarded insulating efficiency, manufacturing procedures, etc.

The basic or primary material of the insulations of this invention, or the category of insulations to which this invention principally applies comprises low density inorganic fibrous material of any apt composition such as and including common or available glass fibers, mineral or rock wool and fibers, asbestos, high temperature refractory type fibers exemplified by alumina-silica fiber. Such fibers can be utilized in substantially any of their conventional insulating forms including discrete fiber, felted or intermeshed into batts, mats, blankets, paper and the like masses, either without or with additional ingredients comprising relatively lightweight additives or fillers of thermal insulating or other properties as for example nodules of fiber, perlite, diatomaceous earth, aerogel, calcium silicate, etc., opacifying agents, binders, waterproofing and the like agents. The fibrous mass or bodies of this invention, as indicated, are of relatively low apparent densities which may range from about 0.5 to 10 pcf. but more typically are less than about 5 pcf., and preferably are of about 2 to 4 pcf.

As is common in many insulations substantially composed of or comprising particulate material such as discrete or staple fibers, a binder of conventional composition may be and preferably is utilized in this invention to impart coherency to the mass of fiber and thereby facilitate handling of the fibrous layers and/or construction of the insulating products comprising the same. Moreover, one of the significant features of the construction of this invention is that the composition of the binder(s) or even other ingredients, viz., whether inorganic or organic, is not critical regardless of whether or not in service the product encounters high temperatures substantially in excess of the thermal decomposition point or maximum limits of one or more ingredients such as a binder of organic composition. Thus, conventional binder materials or systems, and amounts thereof such as typically about 5 to 15% by weight, comprising the usual resin binders of thermosetting materials including, for example, phenol formaldehyde, resorcinol formaldehyde, urea-formaldehyde, furfural-formaldehyde, polyesters, furanes, epoxies, vinyl-phenolics, as well as common inorganic binder regardless of the temperature limits such as low melting point or fusing glass and mineral frits, metals and other inorganic, or relatively low temperature decomposable inorganic or organic constituents of, for example, fillers, pigments, opacifying materials, waterproofing agents, etc. can be employed in the insulations of this invention without limiting their service to applications wherein the maximum temperature encountered must not exceed the limits of the ingredient exhibiting the least resistance to elevated temperature conditions.

The thermal barriers of this invention which are disposed conterminously between or interleaved with the layers or bodies of low density insulating material in the given essential pattern may be composed of thin sheets of substantially any incombustible inorganic sheet such as metallic compositions which are not affected by the temperature actually encountered within the composite product. Although aluminum foil or sheets are preferred due to their over-all desirable properties of low cost, generally adequate temperature resistance, reflective characteristics, non corrosiveness, light weight, among others, other metals may of course be utilized and where the temperature endurance of aluminum is questionable, stainless steel, copper, gold and the like more costly but otherwise equally apt materials can be utilized. The metallic sheets or foil should be relatively thin to minimize solids conduction, weight, costs, forming difficulties, etc., and sheet or foil thicknesses within the approximate range of about 10 to 0.1 mil, preferably about 1 to 0.25 mil are effective, with about 0.35 mil an optimum size.

The thermal insulation products of this invention can be fabricated or constructed simply by building up alternate layers or sheets of the two basic or necessary components in the essential pattern and may comprise simply laying down the first fibrous layer and coextensively superimposing thereon the metal foil and repeating this process until the essential pattern of at least 2 up to about 15 foil sheets per inch of composite insulation thickness have been extended from the intended hot side of the product through towards the intended cold side to at least an intermediate point about ¼ therethrough, preferably about ⅓ to ⅔ therethrough, and wherein the internal temperature of the insulation product is not anticipated to exceed about 500° F. or the temperature limits of the ingredients of the product exhibiting the least resistance to elevated temperatures. When the insulation is to be applied to cylindrical bodies or objects such as pipe or a tank and thereby assume a similar configuration, the product can be formed simply by rolling or convoluting a combination of insulating material and foil simply positioned together or so adhered, or in a conventional fibrous pipe insulation manufacturing procedure such as disclosed in U.S. Letters Patent No. 3,063,887, to Labino, the metal foil can be inserted in layers of fibrous mat during rolling upon the mandrel.

Referring to the drawing, the illustration consists of a fibrous thermal insulation product constructed in accordance with the concepts of this invention showing a typical preferred embodiment thereof, in the common form of an insulating pipe covering designated as 1. The low density inorganic fiber felt 2, containing an organic binder, as is common in the formation of typical insulating pipe coverings, is convolutely wound upon itself to provide an apt cylindrical configuration. An inorganic sheet 3, impervious to gases and flame such as metal foil, is interleaved between layers of the convolutely wound low density, organic bonded fibrous felt beginning adjacent to the hot side of the insulation and continuing about four to five convolutions from the hot side 4, towards the cold side 5, to an intermediate location of about ⅓ of the way therethrough.

The following examples comprise specific illustrations of apt constructions of the insulations of this invention and demonstrate the pronounced effects and/or properties thereof. It should be understood that the specific techniques or means and materials employed or given are merely exemplary and are not to be construed as limiting the invention to any particular forming procedure, materials, conditions or data recited.

Typical cylindrical sections of pipe insulations were formed pursuant to the invention by rolling on a 3 inch mandrel and thereby convoluting around itself a ⅛ inch thick felt of glass fiber containing about 10% by wieght of the fiber of an uncured phenol formaldehyde binder, and upon completion of the first revolution inserting and interleaving a 0.35 mil thick sheet of aluminum foil of like or coextensive dimensions between the convolutions of fiber continuing the wrapping of the foil within the fiber until five complete continuous spirals of foil are formed extending approximately ⅝ inch outward from the internal or hot side of the pipe insulation sections whereupon the inclusion of the foil was terminated and the convoluting of glass fiber was continued until the thickness of the insulation section was accumulated to approximately 2 inches. The thin glass fiber felts or mats utilized were composed of glass fiber having an average fiber diameter of about 2.5 microns and, including the 10% phenol formaldehyde binder content, were of an average density of about 3.3 pcf. and the completed product exhibited a density of about 3.8 pcf. On completion of the pipe sections the resinous binder was cured at about 400° F. One side of these sections was slit to permit installation on pipe.

Similarly produced glass fiber pipe insulation sections representative of commercial products and constructed of laminations of felts of like glass fiber composition and dimension, binder composition, content and cure, and approximately equivalent density in 2 inch thickness were tested and compared at high temperatures along with the products of this invention as a standard and to illustrate the deleterious effects of an organic or low temperature resistant component in a thermal insulation when subjected to relatively high temperature conditions. Samples of the products of this invention and of the conventional product or the standard were evaluated by installing sample sections of the insulated on a 3 inch diameter pipe, and running up the temperature of the pipe to determine the relative effects of elevated temperatures upon the respective types of products.

The samples constructed according to this invention, as set forth above, were subjected to internal pipe temperatures of 1000° F., a temperature far in excess of the ignition or decomposition point of the thermosetting resin binder present, for a period of 7 days and through the internally positioned thermocouples only very slight temperature overrides of about 30° F., i.e., internal temperatures of about 1030° F., were observed due to internal combustion or thermal decomposition of ingredients, which in this case would be the organic resin binder. Nevertheless, the samples constructed according to this invention retained their integrity and insulating properties throughout the 7 day test and upon completion and removal from the test pipe were found to have suffered an insignificant degree of deterioration.

The conventionally constructed samples of pipe insulation of like dimension and materials, but without the thermal barriers, were likewise tested on the pipe apparatus with embedded thermocouples and upon exceeding about 500° F., or between 500 and 600° F., it was evident from the presence of a yellow condensate on the outer surface of the insulation and the evaluation of fumes that resin binder was volatilizing. At an internal pipe temperature of about 600° F., the thermocouples within the sample insulations gave internal temperatures ranging between 700 and 1100° F., due to autogenous combustion or thermal decomposition of ingredients of the insulation, viz., the organic binder in this case. These samples, on exposure to a pipe temperature of 600° F. for 19 hours, were found upon subsequent examination to have had all their binder completely burned out wtih the resulting melting and fusing of the glass fiber and the loss of product integrity and utility. Moreover, in similar testing of thicker samples of resin bonded glass fiber pipe insulation of 4 inches whereby the increased efficiency of the product aggravates these phenomena, the internal temperatures due to autogenous combustion reached levels wherein the glass fiber located within the inner area of the product melted and fused and the internal ignition and rapid expansion of burning gases through the product began at a point when the two sides of the insulation were at 600° F. and 250° F.

It has heretofore apparently been a rather widely or generally accepted concept in the thermal insulating art that in high temperature application wherein the mechanism of solids conduction as a medium of heat transfer becomes a very significant and material factor contributing in the total or over-all thermal conductance of a material or insulation, that metallic components of an insulation, particularly when their mass or dimensions are rather extensive as in the case of sheets of reflective foil, should be spaced or substantially separated from physical contact from the primary insulating material(s) or the balance of the components to avoid degrading the insulating emciency thereof through increased solids conduction. (Note page 10, Insulation Review, vol. 4, May 1960). Moreover, the inclusion of a binder, etc. in any appreciable amounts further contributes to the solids content and/or contacts within the insulation and thereby also detracts from the efficiency of the insulation.

However, it has been found that the construction of the present invention wherein the thermal barriers or metal foils are in intimate physical contact with the fibrous material or other components including binder, etc. there is no discernible degradation of the insulating efficiency of the product over reasonable temperature ranges. Also, it has been found that the construction of this invention provides an insulation which is more efficient at elevated temperatures in relation to like insulations constructed without the interleaved thermal barriers, and exhibits very low conductivities or heat conductance in relation to the weight of the product. For example, the 3.8 pcf. density, 2 inch thick product comprising 5 wraps of 0.35 mil aluminum foil interleaved in 1/8 inch layers of fine glass fiber of about 2½ microns and constructed as above, when compared with conventional insulations of different compositions demonstrated that at the same heat flow (conductance), less weight of this product is needed, and frequently the equivalent heat flow can be achieved with reduced thickness. Evaluation of the relative thermal properties of this product constructed pursuant to this invention and comparable insulation products both of like fibrous composition without the interleaved foil and of unlike but conventional composition including a commercial glass fiber insulation, a commercial calcium silicate insulation produced according to U.S. Letters Patent No. 2,699,097, products composed of high refractory fiber of an aluminum and silica composition, opacified silica insulations of U.S. Letters Patent No. 3,055,831, and commercial magnesium-asbestos-diatomaceous earth insulations pursuant to U.S. Letters Patent No. 2,793,131, produced the following data of Tables I and II.

TABLE I.—THERMAL PROPERTIES

| Construction | 2-inch Thick Glass Felt with 5 Layers of Aluminum Foil | 2-inch Thick Glass Felt | 2-inch Thick Calcium Silicate |
| --- | --- | --- | --- |
| Density | 3.83 | 3.1–3.7 | 13.0 |
| Thermal Conductivity, B.t.u./hr. sq. ft. (F/in.)—Mean Temperature, ° F.: | | | |
| 200 | 0.28 | 0.27–0.29 | 0.40 |
| 300 | 0.33 | 0.33–0.36 | 0.44 |
| 400 | 0.39 | | 0.48 |
| 500 | 0.46 | | 0.53 |
| 550 [1] | 0.50 | | 0.56 |

[1] 960° F. hot surface.

TABLE II.—WEIGHTS AND RELATIVE THERMAL EFFICIENCIES OF CONVENTIONAL AND LAMINATED FOIL-FIBER INSULATIONS

| Insulation | Density (pcf.) | Thermal Conductivity at 500° F. Mean B.t.u. in./hr., sq. ft., ° F. | Thickness at Equal Conductance (in.) | Weight at Equal Conductance (lb./sq. ft.) |
| --- | --- | --- | --- | --- |
| Calcium silicate | 11 | 0.50 | 2.8 | 2.6 |
| Alumina-silica fiber | 3 | 0.57 | 3.2 | 0.8 |
| Do | 10 | 0.43 | 2.4 | 2.0 |
| Silica aerogel, opacified | 9–11 | 0.18 | 1.0 | 0.8 |
| Do | 18 | 0.20–0.24 | 1.2 | 1.8 |
| Do | 19–21 | 0.24 | 1.3 | 2.2 |
| Magnesium-asbestos-diatomaceous earth | 21 | 0.64 | 3.6 | 6.3 |
| Laminated 3 pcf. refractory fiber, 3 aluminum foils per in. thickness | 3 | 0.45 | 2.5 | 0.6 |
| Laminated 2 pcf. glass fiber, 3 aluminum foils per in. thickness | 2.5 | 0.50 | 2.8 | 0.6 |

It will be understood that the foregoing details are given for purposes of illustration and not restriction, and that variations within the spirit of this invention are to be included within the scope of the appended claims.

We claim:
1. A high temperature, low density, composite organic bonded fibrous thermal insulation of at least about two inches thickness constructed of a multiplicity of superimposed layers of inorganic fiber of fine diameter with an organic binder having incombustible inorganic sheets impervious to gases and flame substantially conterminously interleaved between and separated by the superimposed layers of inorganic fiber and organic binder, said incombustible inorganic sheets being interleaved between layers of inorganic fiber and organic binder adjacent to the hot side of the insulation to provide at least 2 up to about 15 inorganic sheets impervious to gases and flame per inch of composite insulation thickness and thus extending from the hot side towards the cold side of the insulation to at least an intermediate point about one-quarter therethrough and where the internal temperature of the insulation does not exceed about 400 to 600° F.

2. A high temperature, low density, composite organic bonded fibrous thermal insulation of at least about 2 inches thickness constructed of a multiplicity of superimposed layers of inorganic fiber of fine diameter with an organic binder having incombustible inorganic sheets impervious to gases and flame substantially conterminously interleaved between and separated by the superimposed layers of inorganic fiber and organic binder, said incombustible inorganic sheets being interleaved between layers of inorganic fiber and organic binder adjacent to the hot side of the insulation to provide at least 2 up to about 15 inorganic sheets impervious to gases and flame per inch of composite insulation thickness and thus extending from the hot side towards the cold side of the insulation to at least an intermediate point about one-quarter therethrough and wherein the internal temperature of the insulation does not exceed about 500° F.

3. A high temperature, low density, composite organic bonded fibrous thermal insulation of at least about 2 inches thickness constructed of a multiplicity of superimposed layers of inorganic fiber of fine diameter with an organic binder having sheets of metal foil imprevious to gases and flame substantially conterminously interleaved between and separated by the superimposed layers of inorganic fiber and organic binder, said sheets of metal foil being interleaved between layers of inorganic fiber and organic binder adjacent to the hot side of the insulation to provide at least 2 up to about 15 foil sheets impervious to gases and flame per inch of composite insulation thickness and thus extending from the said hot side towards the cold side of the insulation to at least an intermediate point of about one-third therethrough and wherein the internal temperature of the insulaion does not exceed about 500° F.

4. A high temperature, low density, composite organic bonded fibrous thermal insulation of at least about 2 inches thickness constructed of a multiplicity of superimposed layers of inorganic fiber with an organic binder of approximately 0.5 to 10 lbs. per cu. ft. density and fibers averaging less than about 10 microns in diameter having sheets of metal foil impervious to gases and flame of approximately 10 to 0.1 mil thick substantially conterminously interleaved between and separated by the superimposed layers of inorganic fiber and organic binder, said sheets of metal foil being interleaved between layers of inorganic fiber and organic binder adjacent to the hot side of the insulation to provide approximately 4 to 12 foil sheets impervious to gases and flame per inch of composite insulation thickness and thus extending from the said hot side towards the cold side of the insulation to at least an intermediate point about one-third therethrough and wherein the internal temperature of the insulation does not exceed about 500° F.

5. A high temperature, low density, composite organic binder fibrous thermal insulation of at least about 2 inches thickness constructed of a multiplicity of superimposed layers of inorganic fiber with an organic binder of approximately 1 to 5 lbs. per cu. ft. density and fibers averaging less than about 5 microns to submicron diameter, having sheets of metal foil impervious to gases and flame approximately 1 to 0.25 mil thick substantially conterminously interleaved and separated by the superimposed layers of inorganic fiber and organic binder, said sheets of metal foil being interleaved between layers of inorganic fiber and organic binder adjacent to the hot side of the insulation to provide approximately 4 to 8 foil sheets impervious to gases and flame per inch of composite insulation thickness and thus extending from the said hot side towards the cold side of the insulation to at least an intermediate point about one-third therethrough and wherein the internal temperature of the insulation does not exceed about 500° F.

6. A high temperature, low density, composite organic bonded fibrous thermal insulation of at least about 2 inches thickness constructed of a multiplicity of superimposed layers of inorganic fiber with an organic binder of approximately 2 to 4 lbs. per cu. ft. density and fibers averaging about 2½ microns in diameter having sheets of metal foil impervious to gases and flame approximately 0.35 mil substantially conterminously interleaved between and separated by the superimposed layers of inorganic fiber and organic binder, said sheets of metal foil being interleaved between layers of inorganic fiber and organic binder adjacent to the hot side of the insulation to provide approximately 5 foil sheets impervious to gases and flame per inch of composite insulation thickness and thus extending from the said hot side towards the cold side of the insulation to at least an intermediate point about one-third therethrough and wherein the internal temperature of the insulation does not exceed about 500° F.

7. A high temperature, low density, composite organic bonded fibrous thermal insulation of at least about 2 inches thickness for pipe and cylindrical bodies constructed of a multiplicity of convoluted layers of inorganic fiber of fine diameter with an organic binder having incombustible inorganic sheets impervious to gases and flame substantially conterminously interleaved between and separated by the convoluted layers of inorganic fiber and organic binder, said incombustible inorganic sheets being interleaved between layers of inorganic fiber and organic binder adjacent to the hot side of the insulation to provide at least 2 up to about 15 foil sheets impervious to gases and flame per inch of composite insulation thickness and thus extending from the said hot side towards the cold side of the insulation to at least an intermediate point about one-quarter therethrough and wherein the internal temperature of the insulation does not exceed about 400 to 600° F.

8. A high temperature, low density, composite organic bonded fibrous thermal insulation of at least about 2 inches thickness for pipe and cylindrical bodies constructed of a multiplicity of convoluted layers of inorganic fiber of fine diameter with an organic binder having sheets of metal foil impervious to gases and flame substantially conterminously interleaved between and separated by the convoluted layers of inorganic fiber and organic binders, said sheets of metal foil being interleaved between layers of inorganic fiber and organic binder adjacent to the hot side of the insulation to provide at least 2 up to about 15 foil sheets impervious to gases and flame per inch of composite insulation thickness and thus extending from the hot side towards the cold side of the insulation to at least an intermediate point about one-quarter therethrough and wherein the internal temperature of the insulation does not exceed about 500° F.

9. A high temperature, low density, composite organic bonded fibrous thermal insulation of at least about 2 inches thickness for pipe and cylindrical bodies constructed of a multiplicity of convoluted layers of inorganic fiber of fine diameter with an organic binder having sheets of metal foil impervious to gases and flame substantially conterminously interleaved between and separated by the convoluted layers of inorganic fiber and organic binder, said sheets of metal foil being interleaved between layers of inorganic fiber and organic binder adjacent to the hot side of the insulation to provide at least 2 up to about 15 foil sheets impervious to gases and flame per inch of composite insulation thickness and thus extending from the said hot side towards the cold side of the insulation to at least an intermediate point about one-third therethrough and wherein the internal temperature of the insulation does not exceed about 500° F.

10. A high temperature, low density, composite organic bonded fibrous thermal insulation of at least about 2 inches thickness for pipe and cylindrical bodies constructed of a multiplicity of convoluted layers of inorganic fiber with an organic binder of approximately 1 to 10 lbs. per. cu. ft. density and fibers averaging less than about 10 microns diameter having sheets of metal foil impervious to gases and flame approximately 10 to 0.1 mil thick substantially conterminously interleaved between and separated by the convoluted layers of inorganic fiber and organic binder, said sheets of metal foil being interleaved between layers of inorganic fiber and organic binder adjacent to the hot side of the insulation to provide approximately 4 to 12 sheets of foil impervious to gases and flame per inch of composite insulation thickess and thus extending from the said hot side towards the cold side of the insulation to at least an intermediate point about one-third therethrough and wherein the internal temperature of the insulation does not exceed about 500° F.

11. A high temperature, low density, composite organic bonded fibrous thermal insulation of at least about 2 inches thickness for pipe and cylindrical bodies constructed of a multiplicity of convoluted layers of inorganic fiber with an organic binder of approximately 1 to 5 lbs. per cu. ft. density and fiber averaging less than about 5 microns to submicron in diameter having sheets of metal foil impervious to gases and flame approximately 1 to 0.25 mil thick substantially conterminously interleaved between and separated by the convoluted layers of inorganic fiber and organic binder, said sheets of metal foil being interleaved between the layers of inorganic fiber and organic binder adjacent to the hot side of the insulation to provide approximately 4 to 8 foil sheets impervious to gases and flame per inch of composite insulation and thus extending from the said hot side towards the cold side of the insulation to at least an intermediate point about one-third therethrough and wherein the internal temperature of the insulation does not exceed about 500° F.

12. A high temperature, low density, composite organic bonded fibrous thermal insulation of at least about 2 inches thickness for pipe and cylindrical bodies constructed of a multiplicity of convoluted layers of inorganic fiber with an organic binder of approximately 2 to 4 lbs. per cu. ft. density and averaging about 2½ microns in diameter having sheets of metal foil impervious to gases and flame approximately 0.35 mil substantially conterminously interleaved between and separated by the convoluted layers of inorganic fiber and organic binder, said sheets of metal foil being interleaved between layers of inorganic fiber and organic binder adjacent to the hot side of the insulation to provide approximately 5 foil sheets impervious to gases and flame per inch of composite insulation thickness and thus extending from the said hot side towards the cold side of the insulation to at least an intermediate point about one-third therethrough and wherein the internal temperature of the insulation does not exceed about 500° F.

References Cited

UNITED STATES PATENTS 3,009,601  11/1961  Maitsch _____ 220—9
3,199,715  8/1965  Paivanas _____ 220—9

LAVERNE D. GEIGER, *Primary Examiner.*

T. MOORHEAD, B. KILE, *Assistant Examiners.*